United States Patent
Jiang et al.

(10) Patent No.: US 11,095,411 B2
(45) Date of Patent: Aug. 17, 2021

(54) DEMODULATION REFERENCE SIGNAL DESIGN FOR VEHICLE-TO-VEHICLE COMMUNICATION

(71) Applicant: QUALCOMM Incorporated, San Diego, CA (US)

(72) Inventors: Libin Jiang, Bridgewater, NJ (US); Shailesh Patil, Raritan, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 26 days.

(21) Appl. No.: 15/662,134

(22) Filed: Jul. 27, 2017

(65) Prior Publication Data
US 2018/0048446 A1 Feb. 15, 2018

Related U.S. Application Data

(60) Provisional application No. 62/374,596, filed on Aug. 12, 2016.

(51) Int. Cl.
*H04L 5/00* (2006.01)
*H04L 29/08* (2006.01)
(Continued)

(52) U.S. Cl.
CPC ............ *H04L 5/0051* (2013.01); *H04L 67/12* (2013.01); *H04W 72/1284* (2013.01); *H04W 4/06* (2013.01); *H04W 4/46* (2018.02)

(58) Field of Classification Search
CPC ....... H04W 76/14; H04W 8/005; H04W 4/70; H04W 4/40
See application file for complete search history.

(56) References Cited

U.S. PATENT DOCUMENTS 10,244,378 B2    3/2019  Shin et al.
2013/0072241 A1*  3/2013  Sorrentino .......... H04L 25/0224
                                                        455/501
(Continued)

FOREIGN PATENT DOCUMENTS

CN      101645868 A     2/2010
CN      101882980 A    11/2010
(Continued)

OTHER PUBLICATIONS

International Search Report and Written Opinion—PCT/US2017/044426—ISA/EPO—dated Oct. 9, 2017.
(Continued)

*Primary Examiner* — Jaime M Holliday
(74) *Attorney, Agent, or Firm* — Procopio, Cory, Hargreaves & Savitch LLP

(57) ABSTRACT

Various features described herein relate to DM-RS design for a control channel and a data channel that maybe used for vehicular communications. In an aspect, a UE may determine a base DM-RS sequence associated with a control channel for V2V communication. The UE may further determine a DM-RS sequence based on the base DM-RS sequence and an identity of the UE, and transmit a plurality of DM-RS symbols within the control channel in a subframe using the DM-RS sequence. In another aspect, a UE may generate a plurality of DM-RS sequences, each DM-RS sequence maybe generated for a corresponding DM-RS symbol of a plurality of DM-RS symbols associated with a data channel for V2V communication based on a DM-RS symbol number of the corresponding DM-RS symbol. The UE may transmit the plurality of DM-RS symbols within the data channel in a subframe using the plurality of DM-RS sequences.

32 Claims, 9 Drawing Sheets

(51) Int. Cl.
*H04W 72/12* (2009.01)
*H04W 4/06* (2009.01)
*H04W 4/46* (2018.01)

(56) References Cited

U.S. PATENT DOCUMENTS

| | | | | |
|---|---|---|---|---|
| 2014/0003262 | A1* | 1/2014 | He | H04W 28/08 |
| | | | | 370/252 |
| 2015/0181589 | A1 | 6/2015 | Luo et al. | |
| 2016/0014812 | A1* | 1/2016 | Park | H04L 5/0048 |
| | | | | 370/329 |
| 2016/0135240 | A1* | 5/2016 | Yoon | H04W 8/005 |
| | | | | 370/329 |
| 2016/0323129 | A1* | 11/2016 | Wang | H04L 27/2613 |
| 2016/0381670 | A1* | 12/2016 | Kim | H04L 5/0048 |
| | | | | 370/329 |
| 2017/0094657 | A1* | 3/2017 | Yoon | H04L 5/0012 |
| 2018/0176043 | A1* | 6/2018 | Kim | H04L 5/0048 |
| 2019/0036746 | A1* | 1/2019 | Hwang | H04L 27/3444 |

FOREIGN PATENT DOCUMENTS

| | | |
|---|---|---|
| CN | 103220791 A | 7/2013 |
| EP | 2787674 A4 | 11/2014 |
| WO | 2011053836 A2 | 5/2011 |
| WO | 2015094816 A1 | 6/2015 |
| WO | 2015103788 A1 | 7/2015 |
| WO | 2016013888 A1 | 1/2016 |
| WO | 2016117922 A1 | 7/2016 |

OTHER PUBLICATIONS

Nokia, et al., "Evaluation of DMRS Enhancement for V2V with high Doppler," 3GPP Draft; R1-162538, 3rd Generation Partnership Project (3GPP), Mobile Competence Centre; 650, Route Des Lucioles; F-06921 Sophia-Antipolis, vol. RAN WG1, No. Busan, Korea; Apr. 11, 2016-Apr. 15, 2016, Apr. 1, 2016, XP051079823, 10 pages, Retrieved from the Internet: URL: http://www.3gpp.org/ftp/tsg_ran/WG1_RL1/TSGR1_84b/Docs/ [retrieved on Apr. 1, 2016].

Sony: "Discussion on DMRS Enhancement and Operation for V2V," 3GPP Draft; R1-160677, 3rd Generation Partnership Project, Mobile Competence Centre; 650, Route Des Lucioles; F-06921 Sophia-Antipolis CED, vol. RAN NG1, No. St Julian's, Feb. 15, 2016-Feb. 19, 2016, Feb. 14, 2016, XP051054005, 3 pages, and Retrieved from the Internet: URL:http://www.3gpp.org/ftp/Meetings_3GPP_SYNC/RAN1/Docs/ [retrieved on Feb. 14, 2016].

European Search Report—EP20170101—Search Authority—The Hague—dated Jun. 8, 2020.

* cited by examiner

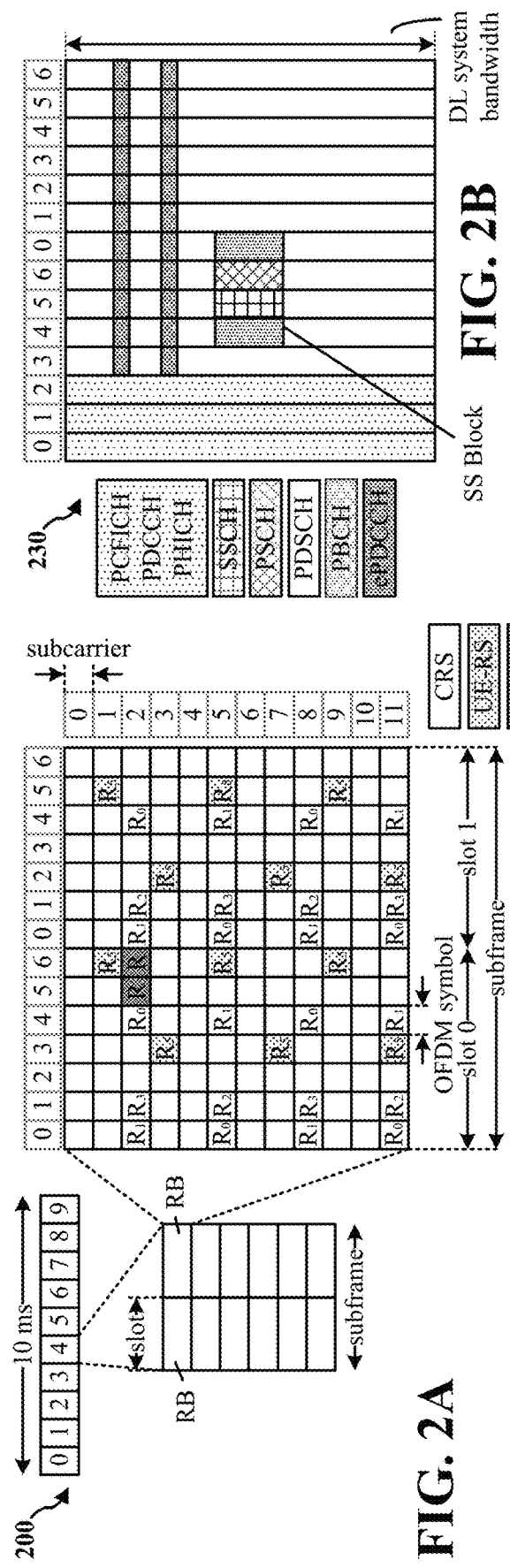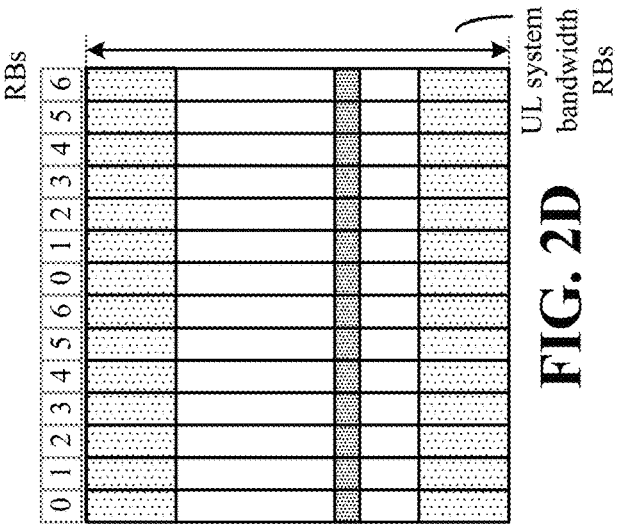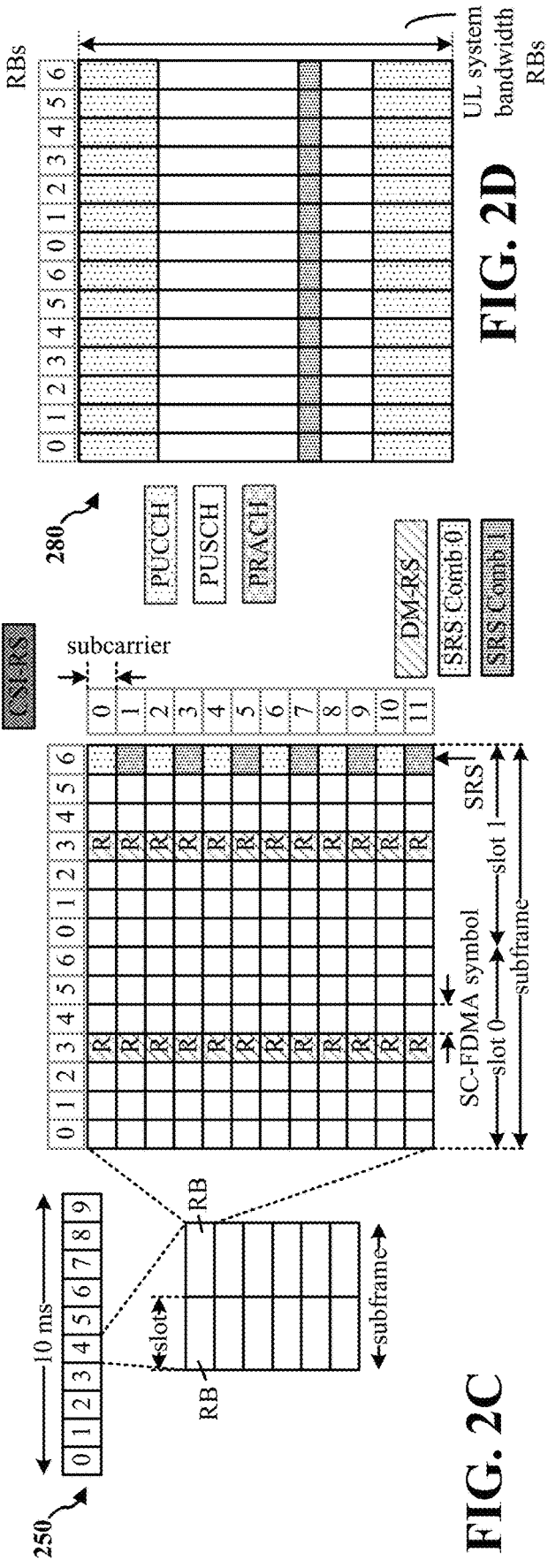
FIG. 2A  FIG. 2B  FIG. 2C  FIG. 2D

DEMODULATION REFERENCE SIGNAL DESIGN FOR VEHICLE-TO-VEHICLE COMMUNICATION

CROSS-REFERENCE TO RELATED APPLICATION(S)

This application claims the benefit of U.S. Provisional Application Ser. No. 62/374,596, entitled DEMODULATION REFERENCE SIGNAL DESIGN FOR VEHICLE-TO-VEHICLE COMMUNICATION filed on Aug. 12, 2016, which is expressly incorporated by reference herein in its entirety.

BACKGROUND

Field

The present disclosure relates generally to communication systems, and more particularly, to methods and apparatus that can be used in a vehicle-to-vehicle (V2V) communication system.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

The automotive industry is evolving at a fast rate and so are the technical needs of the automotive industry including the need for effective vehicular communication. A number of communication industries and work groups are developing technologies to improve direct communication between vehicles.

Reference signals are transmitted in a channel to allow a receiving device, in a pair of transmitting and receiving devices, to perform channel estimation and properly demodulate and decode the information transmitted in the channel. There is a need for improved design of reference signals and/or channel structure that may be used for device-to-device and/or vehicle-to-vehicle communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various features and configurations described herein relate to demodulation reference signal (DM-RS) design for a control channel (e.g., PSCCH) and a data channel (e.g., PSSCH) that may be used for vehicular communications, e.g., in V2V communication systems, as well as in other direct device-to-device (D2D) type communications. In accordance with an aspect, in one configuration four DM-RS symbols may be used in both the control channel and the data channel utilized in a V2V communication system, rather than two DM-RS symbols as in some other earlier systems. To achieve such a DM-RS design, the procedure of generating DM-RS sequences may be modified as discussed further in the detailed description that follows. In traditional D2D communication systems (e.g., as defined in LTE Release-12), the control channel transmitted by different user equipments (UEs) use the same DM-RS sequence in the transmitted DM-RS symbols, which may lead to DM-RS collisions and degrades the control channel decoding performance. For example, if two UEs happen to choose the same resource for transmitting, their DM-RS may collide. At a receiving device, the receiver may observe the combined channel of the two different UEs and therefore the channel estimation at the receiver may be corrupt and incorrect. Thus, in order to avoid such DM-RS collisions and degradation of the control channel decoding performance, in an aspect different UEs use different DM-RS sequences in the DM-RS symbols transmitted in their respective control channels. For example, in one configuration a first UE, e.g., a first vehicle, may determine a first DM-RS sequence based on an identity of the first UE and use the first DM-RS sequence for a plurality of DM-RS symbols within a control channel in a subframe transmitted by the first device, whereas a second UE, e.g., a second vehicle, may determine a second DM-RS sequence based on an identity of the second UE and use the second DM-RS sequence for a plurality of DM-RS symbols within a control channel in a subframe transmitted by the second UE.

Some features related to the DM-RS design for the control and data channels described herein provide advantages and improvements over existing V2V communication solutions, more so in high speed and high density (e.g., high number of nodes) environments. In an aspect, in some configurations, additional DM-RS symbols (e.g., as compared to earlier/existing systems) in the control and data channel subframes are used. The use of additional DM-RS symbols in the channel (e.g., control and data channels) may be advantageous, e.g., for handling high Doppler associated with high relative speeds at high frequencies, and allowing for better tracking/estimation of the data channel at high speeds.

In an aspect of the disclosure, a method, a computer-readable medium, and an apparatus for vehicle-to-vehicle communication are provided. The apparatus may be a UE.

The apparatus may be configured to determine a base DM-RS sequence associated with a control channel for vehicle-to-vehicle communication. The apparatus may be further configured to determine a DM-RS sequence based on the base DM-RS sequence and an identity of the UE, and transmit a plurality of DM-RS symbols within the control channel in a subframe using the DM-RS sequence.

In another aspect of the disclosure, a method, a computer-readable medium, and an apparatus for vehicle-to-vehicle communication are provided. The apparatus may be a UE. The apparatus may be configured to generate a plurality of DM-RS sequences. Each DM-RS sequence may be generated for a corresponding DM-RS symbol of a plurality of DM-RS symbols associated with a data channel for vehicle-to-vehicle communication based on a DM-RS symbol number of the corresponding DM-RS symbol. The apparatus may transmit the plurality of DM-RS symbols within the data channel in a subframe using the plurality of DM-RS sequences.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL frame structure, DL channels within the DL frame structure, an UL frame structure, and UL channels within the UL frame structure, respectively.

DETAILED DESCRIPTION

Figure 1:
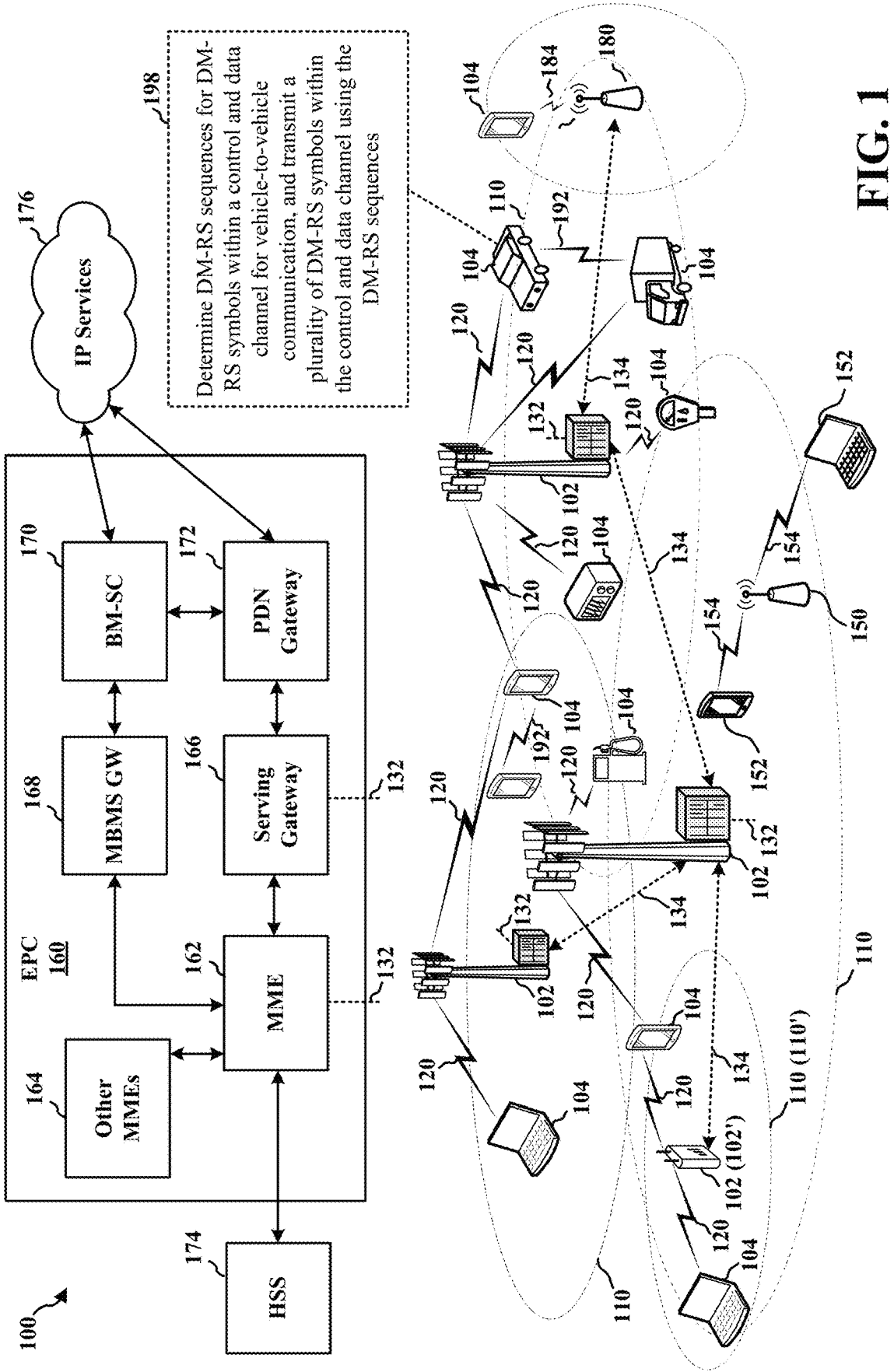
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions:

transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device communication link 192. In some configurations, when the UEs 104 communicating with each other using the communication link 192 are vehicles (or where UEs 104 are implemented as part of vehicles), the communication link 192 may be a V2V communication link and the communicating UEs 104 (e.g., vehicles) may be said to be in V2V communication. Some of the UEs 104 communicate together in V2V communication using the DL/UL WWAN spectrum, some may communicate with the base station 102, and some may do both. Thus, the communication link 192 may use the DL/UL WWAN spectrum. The V2V communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless V2V communications systems, such as for example, a wireless vehicle-to-vehicle communication system based on FlashLinQ, WiMedia, Bluetooth, ZigBee, or Wi-Fi based on the IEEE 802.11 standard, LTE, or NR. To simplify the discussion, the exemplary methods and apparatus are discussed within the context of LTE. However, one of ordinary skill in the art would understand that the exemplary methods and apparatuses are applicable more generally to a variety of other wireless vehicle-to-vehicle communication systems.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to determine DM-RS sequences for DM-RS symbols within a control and data channel for vehicle-to-vehicle communication, and transmit a plurality of DM-RS symbols within the control and data channel using the DM-RS sequences (198). For example, in one configuration the UE 104 may be configured to determine (198) a DM-RS sequence based on a base DM-RS sequence associated with a control channel for V2V communication and an identity of the UE 104, and transmit (198) a plurality of DM-RS symbols within the control channel in a subframe using the DM-RS sequence. In one configuration, the UE 104 may be further configured to generate a plurality of DM-RS sequences, each DM-RS sequence being generated for a corresponding DM-RS symbol of a plurality of DM-RS symbols associated with a data channel for V2V communication based on a DM-RS symbol number of the corresponding DM-RS symbol, and transmit the plurality of DM-RS symbols within the data channel in a subframe using the plurality of DM-RS sequences.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
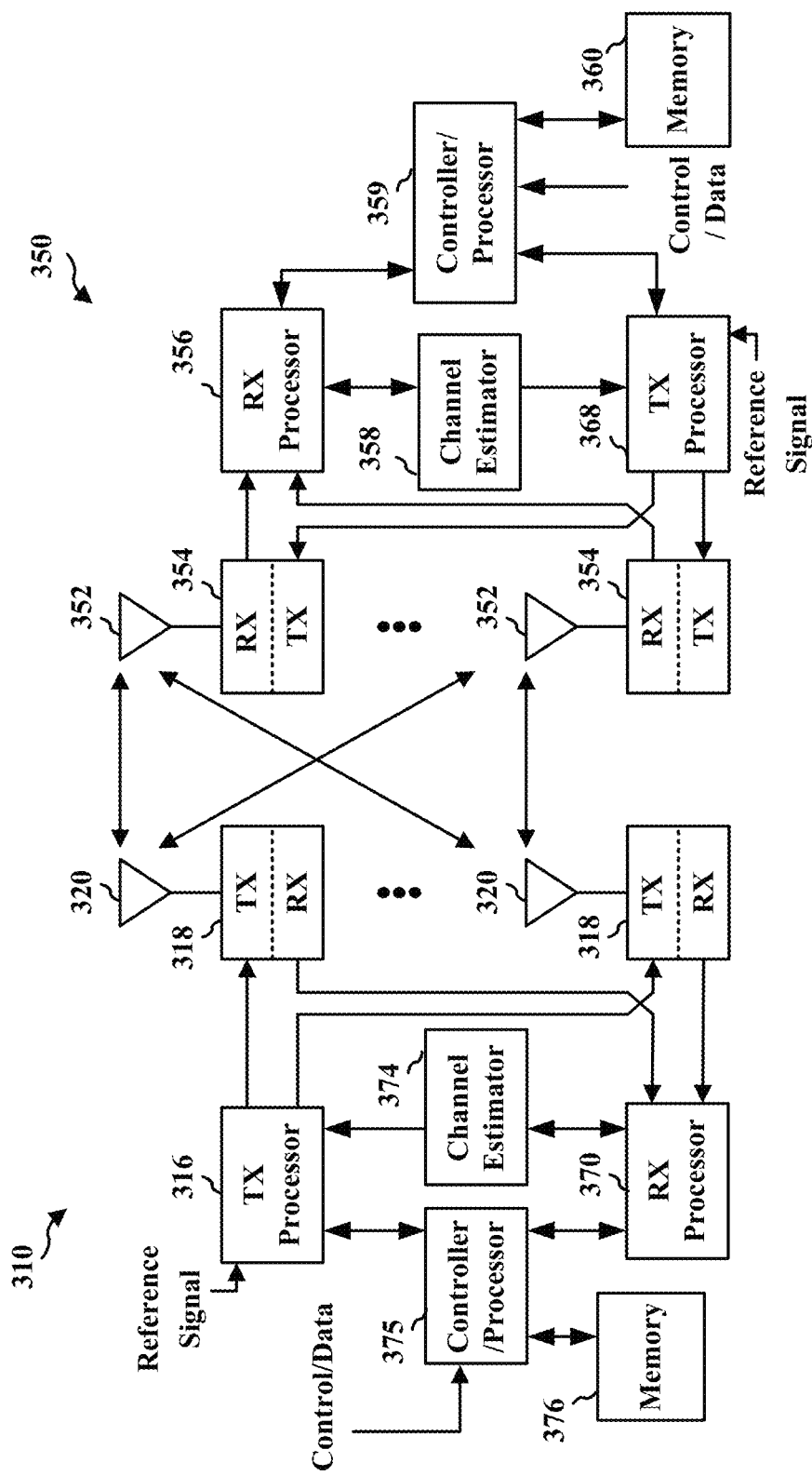
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Various features and configurations described herein relate to DM-RS design for a control channel (e.g., PSCCH) and a data channel (e.g., PSSCH) that may be used for vehicular communications including direct communication between vehicles (also referred to as V2V communication), vehicle to pedestrian and vehicle to infrastructure. In accordance with an aspect, in one configuration four DM-RS symbols may be used in both the control channel and the data channel utilized in a V2V communication system, rather than two DM-RS symbols as in some other systems. To achieve such a DM-RS design, the procedure of generating DM-RS sequences may need to be modified. Also, in traditional D2D communication systems (e.g., as defined in LTE Release-12), the control channel transmitted by different UEs uses the same DM-RS sequence in the transmitted DM-RS symbols, which may lead to DM-RS collisions and degrades the control channel decoding performance. For example, if two UEs happen to choose the same resource for transmitting, their DM-RS may collide. At a receiving device, the receiver will observe the combined channel of the two different UEs and therefore the channel estimation at the receiver may be corrupt and incorrect. Thus, in order to avoid such DM-RS collisions and degradation of the control channel decoding performance, it is desirable that different UEs use different DM-RS sequence in their respective transmitted DM-RS symbols.

In one configuration, the base sequence for the control channel (e.g., PSCCH) may be configured by an eNB or may be pre-configured (e.g., by the mobile network operator). For example, the value of base sequence index u for determining base DM-RS sequence may be configured by an eNB or pre-configured.

In one configuration, the control channel (e.g., PSCCH) transmitted by a UE may use the same DM-RS sequence in all DM-RS symbols (e.g., all four DM-RS symbols have the same DM-RS sequence). The DM-RS sequence may be chosen from a set of K possible DM-RS sequences, which are cyclic-shifted versions for a base DM-RS sequence. The set of K possible DM-RS sequences may be a subset of all possible DM-RS sequences that are cyclic-shifted versions of the base DM-RS sequence. In one configuration, K may be 4. In one configuration, the cyclic shift may be a function of the UE identity, such as SAE-Temporary Mobile Subscriber Identity (S-TMSI) or any other identity that may identify the UE. In one configuration, the four DM-RS symbols in the control channel (e.g., PSCCH) may be multiplied by an orthogonal sequence [1 1 1 1], e.g., prior to transmission.

Figure 4:
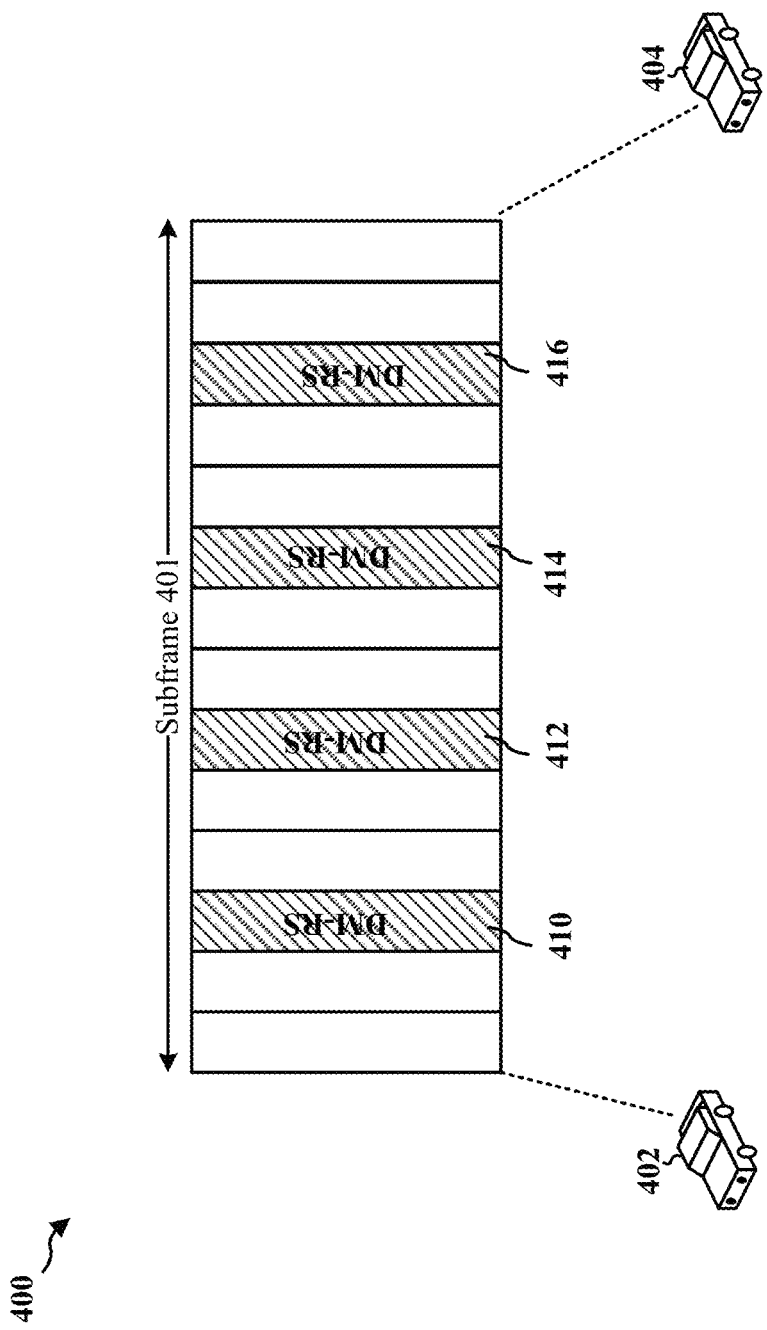
FIG. 4 illustrates an example structure of a control channel, e.g., a physical sidelink control channel (PSCCH), used for V2V communication in some configurations.
Figure 5:
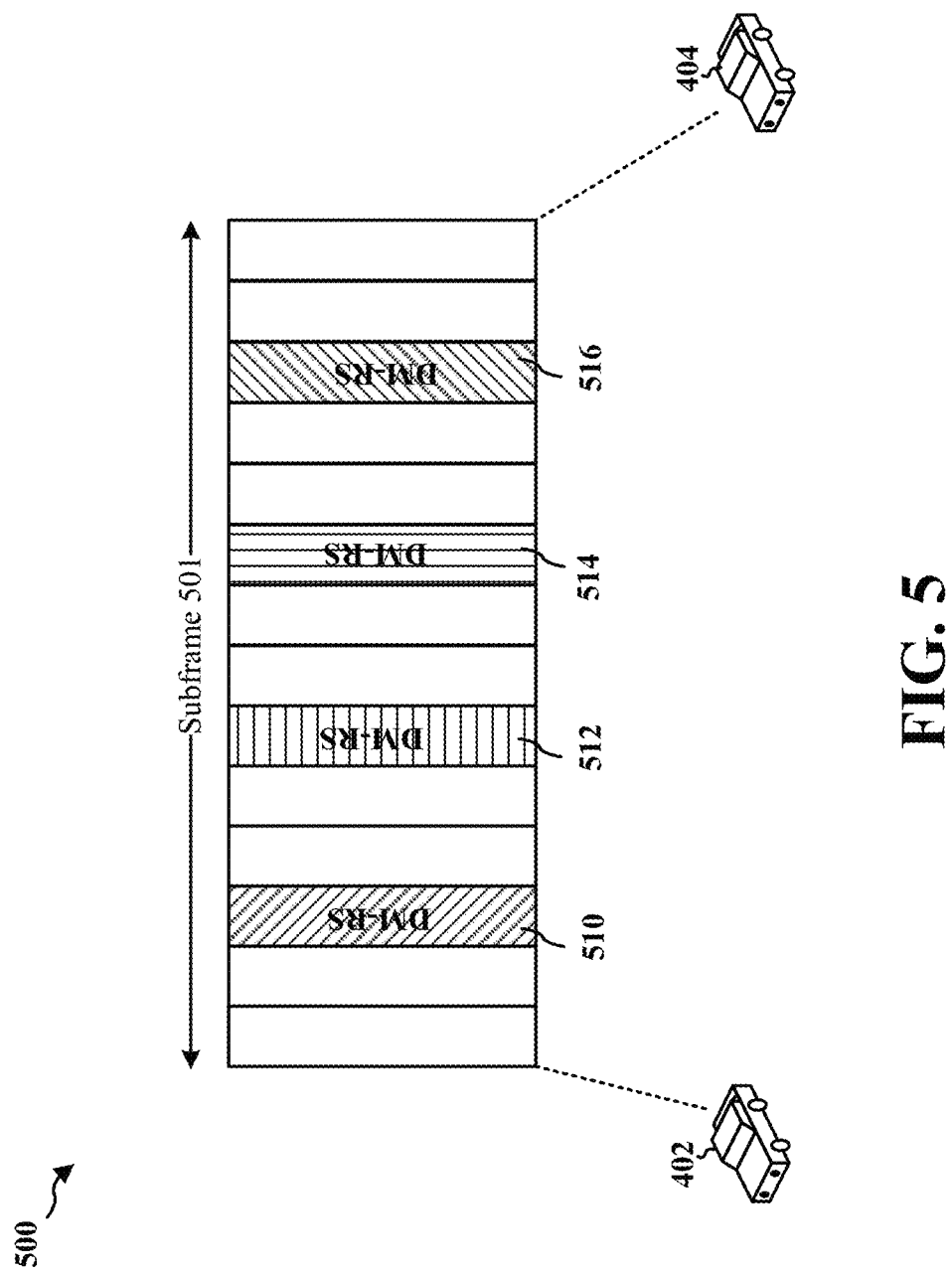
FIG. 5 illustrates an example structure of a data channel, e.g., a physical sidelink shared channel (PSSCH), used for V2V communication in some configurations.

In one configuration of sidelink channels that may be used for V2V communication, the DM-RS, in the time domain, may occupy multiple symbols (e.g., more than two) of the subframe including the control/data channel as shown in FIGS. 4-5. For example, in one configuration, in the time domain the DM-RS for a control channel, e.g., PSCCH, that may be used for V2V communication may occupy the $3^{rd}$ (410) $6^{th}$ (412), $9^{th}$ (414), and $12^{th}$ (416) symbols of the subframe 401 including the control channel as illustrated in FIG. 4. FIG. 4 illustrates an example structure of a control channel 400, e.g., PSCCH, used for V2V communication (e.g., between UEs 402 and 404) in some configurations. In the illustrated example configuration, there are a total of 4 DM-RS symbols in the control channel 400 transmitted in the subframe 401 and there may be 2 DM-RS symbols in each slot for a normal cyclic prefix case. As discussed supra, to support a number of UEs using different DM-RS sequences, a large number of different DM-RS sequences may be desired in some configurations. A number of different DM-RS sequences may be derived by applying different cyclic shifts ($\alpha$) to a base DM-RS sequence $\bar{r}_{u,v}(n)$. For example, a DM-RS sequence $r_{u,v}^{(\alpha)}(n)$ may be derived by a cyclic shift ($\alpha$) of sequence $\bar{r}_{u,v}(n)$ based on the following equation:

$$r_{u,v}^{(\alpha)}(n)=e^{j\alpha n}\bar{r}_{u,v}(n), 0\leq n<M_{SC}^{RS} \qquad (1),$$

where $M_{SC}^{RS}=m\,N_{SC}^{RB}$ is the length of DMRS sequence, m is the resource block number and $N_{SC}^{RB}$ is the subcarrier number within each resource block. Base sequences $\bar{r}_{u,v}(n)$ may be divided into 30 groups with u $\in\{0, 1, 2, \ldots, 29\}$. Each group may contain one base sequence when $1\leq m\leq 5$. In accordance with an aspect, a DM-RS sequence may be selected by the transmitting UE 402 from a pool of different DM-RS sequences (e.g., such as the DM-RS sequence of equation (1)). The different DM-RS sequences in the pool may include different cyclic shifted versions of the base DM-RS sequence. In one configuration, the pool may include four cyclic shifted versions of the base sequence, e.g., obtained using 4 different cyclic shifts. For example, the base sequence may be first converted to time domain, then the time domain sequence may be circularly shifted by, e.g., 0, 6, 12, 18 samples. In one configuration, the selection may be based on the identity of the UE 402. For example, the identity of the UE 402 may be mapped to a DM-RS sequence from the pool using a predetermined function and the mapped DM-RS sequence is selected as the DM-RS sequence for the DM-RS symbols in the control channel transmitted by the UE 402. In some configurations, the identity of the UE may be the TMSI of the UE 402. As illustrated, in some configurations, four DM-RS symbols may be included in the control channel within the subframe 401, with each DM-RS symbol having the same DM-RS sequence (e.g., the same fill pattern in all 4 DM-RS symbols indicating the same DM-RS sequence for all). In some other configurations, a different number of DM-RS symbols (e.g., greater than 2) may be used within the subframe corresponding to a control channel.

FIG. 5 illustrates an example structure of a data channel 500, e.g., PSSCH, used for V2V communication in one exemplary configuration. The data channel 500 may be transmitted by the UE 402 in a subframe 501 and a corresponding set of RBs (e.g., the subframe 501 and the set of RBs are the time-frequency resources of the data channel 500). In the illustrated example, there are a total of 4 DM-RS symbols in the subframe corresponding to the data channel 500. In one configuration, there may be 2 DM-RS symbols in each slot, e.g., for a normal CP case. As illustrated, the DM-RS symbols may occupy the $3^{rd}$, $6^{th}$, $9^{th}$, and $12^{th}$ symbols of the subframe corresponding to the data channel 500 transmitted by UE 402. However other arrangements of DM-RS symbols within the subframe are possible. In accordance with an aspect, in the case of a data channel such as the data channel 500, each of the DM-RS symbols within the subframe 501 may have a different DM-RS sequence (different fill pattern in each of the 4 DM-RS symbols indicating use of a different DM-RS sequence for each DM-RS symbol in the data channel). In some configurations, the DM-RS sequences for the PSSCH may be based on a symbol number. For example, in one configuration, the group-hopping procedure that generates DM-RS sequences for the data channel 500 (e.g., PSSCH) may be based on a DM-RS symbol number, instead of the slot number as is done in traditional LTE communication systems. However the "DM-RS symbol number" does not necessarily represent a symbol number within a subframe, rather the DM-RS symbol number indicates an index of the DM-RS symbol in reference to a frame. The DM-RS symbol number may be defined as $4*n\_\{ssf\}^\{PSSCH\}+i$, where i=0, 1, 2, 3 indicates the DM-RS symbol index within a subframe, and $n\_\{ssf\}^\{PSSCH\}$ is the subframe number modulo 10. Such group hopping based on the DM-RS symbol number provides an index of the DM-RS base sequence that may be used for generating the DM-RS sequences for the DM-RS symbols of the data channel. Thus, the DM-RS symbol number so obtained using the above formula may be mapped to an index of a DM-RS base sequence that may be used in generating a DM-RS sequence for a DM-RS symbol of the data channel. In the case where the data channel has 4 DM-RS symbols in the subframe (i=0, 1, 2, 3), for a single value of "$n\_\{ssf\}^\{PSSCH\}$" 4 DM-RS symbol numbers may be obtained (since i=0, 1, 2, 3) for 4 corresponding DM-RS sequences.

Consider an example with $n\_\{ssf\}^\{PSSCH\}=0$ (the subframe number modulo 10=0), e.g., subframe 501 may be subframe number 0 (e.g., first subframe) of a frame. In this example, based on the above formula the DM-RS symbol number for generating a DM-RS sequence for a corresponding DM-RS symbol of the data channel 500 will be 4*0+i (where i=0, 1, 2, 3 indicates the DM-RS symbol index within the subframe 501, e.g., with DM-RS symbol 510 corresponding to i=0 being the first DM-RS symbol within subframe 501, DM-RS symbol 512 corresponding to i=1 being the second DM-RS symbol within subframe 501, DM-RS symbol 514 corresponding to i=2 being the third DM-RS symbol within subframe 501, and DM-RS symbol 516 corresponding to i=3 being the fourth DM-RS symbol within subframe 501). In this example, since $n\_\{ssf\}^\{PSSCH\}=0$, the DM-RS symbol number for generating a DM-RS sequence for a corresponding DM-RS symbol of the data channel is the same as the DM-RS symbol index in the subframe 501. Thus the DM-RS sequences for the DM-RS symbols in the data channel 500, in this particular example, may be determined based on DM-RS symbol numbers 0, 1, 2, 3. Thus, in this example the DM-RS sequence for the DM-RS symbol 510 may be determined based on symbol number "0", e.g., by using a DM-RS base sequence with an index (u=f(0), where f(.) is a function) for generating the DM-RS sequence for the DM-RS symbol 510. Further, the DM-RS sequences for the DM-RS symbols 512, 514, and 516 may be determined based on DM-RS symbol numbers 1, 2, and 3 respectively, e.g., by using DM-RS base sequences corresponding to indices u=f(1), f(2), and f(3) respectively for generating the DM-RS sequences for the DM-RS symbols 512, 514, and 516.

In another example, $n \{ssf\}^\{PSSCH\}=1$ (i.e., the subframe number modulo 10=1). In this example, based on the above formula the DM-RS symbol number for generating a DM-RS sequence for a corresponding DM-RS symbol of the data channel 500 will be (4*1+i). In this example, since n {ssf}^{PSSCH}=1, the DM-RS symbol numbers for generating DM-RS sequences for corresponding DM-RS symbols of the data channel 500 are (4+0), (4+1), (4+2), and (4+3), i.e., 4, 5, 6, and 7. Thus in this example, the DM-RS sequence for the DM-RS symbol 510 may be determined based on symbol number "4", e.g., by using a DM-RS base sequence corresponding to index (u=f(4)) in generating the DM-RS sequence for the DM-RS symbol 510. Further, the DM-RS sequence for the DM-RS symbols 512, 514, and 516 may be determined based on DM-RS symbol numbers 5, 6, and 7 respectively, e.g., by using a DM-RS base sequence corresponding to index u=f(5), f(6), and f(7) respectively. The above formula $(4*n\_\{ssf\}^\{PSSCH\}+i)$ for obtaining the DM-RS symbol number is provided as an example of a process of obtaining a randomized value of the base sequence index (u) that may then be used for generating the DM-RS sequence for a DM-RS symbol of the data channel and many other variations to achieve the same may be utilized.

A data channel, e.g., a PSSCH, that may be used by a UE for transmitting data to another UE may be associated with a control channel, e.g., PSCCH. For example, the data channel 500 may be associated with the control channel 400. The PSCCH subframes may precede the subframes for PSSCH transmission in some configurations, but not necessarily in all configurations. The control channel 400 may include a scheduling assignment (SA) identifier (ID) along with other control information, e.g., such as resource information identifying the resources on which the PSSCH is transmitted, modulation and coding scheme (MCS) information etc. For example, with reference to FIG. 4, the control information may be transmitted in the other symbols of the control channel 400 besides the DM-RS symbols 410, 412, 414, and 416. Among other things, the control information may be used by the receiving UE (e.g., UE 404) to determine the resources on which data intended for the receiving UE 404 is transmitted. Once the control channel 400 is decoded by the receiving UE, the receiving UE knows where to find the data transmission (e.g., the data channel 500) associated with the control channel 400.

In an aspect, the 4 DM-RS symbols in the data channel 500 may be multiplied (e.g., by a UE transmitting the data channel) by an orthogonal sequence. In one configuration, the orthogonal sequence being multiplied may be [1 1 1 1] if the scheduling assignment identifier (SA ID) transmitted in the associated control channel (e.g., PSCCH) is an even number, and the orthogonal sequence multiplied to the 4 DM-RS symbols in the data channel may be [1 −1 1 −1] if the SA ID is an odd number. Thus, if the SA ID in the control channel 400 is an even number, then the 4 DM-RS symbols in the data channel 500 may be multiplied by the orthogonal sequence [1 1 1 1], while the 4 DM-RS symbols in the data channel 500 may be multiplied by the orthogonal sequence [1 −1 1 −1] if the SA ID in the control channel 400 is an odd number. From the perspective of the receiving UE 404, once the control channel 400 has been decoded and the SA ID determined, the UE 404 may be able to determine the orthogonal sequence used for the DM-RS symbols of the data channel 500 based on whether the SA ID is even or odd. Various additional details are discussed below and will become clearer in view of the method of flowchart 700.

As discussed with respect to the various aspects related to the control and data channel described above, in some configurations the same DM-RS sequence may be used for all DM-RS symbols (e.g., for the 4 DM-RS symbols) in the control channel while a different DM-RS sequence may be used for each of the DM-RS symbols of the data channel. Generally, different DRMS sequences provide extra diversity and better decoding performance. However, since the coding rate used in the control channel (e.g., PSCCH) may be quite low (e.g., in other words, the information redundancy in the transmission may be quite high), there may be no significant benefit in using different DMRS sequences for the DM-RS symbols in the control channel. However, for the data channel (e.g., PSSCH) the benefit of using different DMRS sequences is considerable. Accordingly, in at least some configurations, the same DMRS sequence may be used for the DM-RS symbols associated with the PSCCH to simplify the design but different sequences may be used for the DM-RS symbols associated with the PSSCH.

Figure 6:
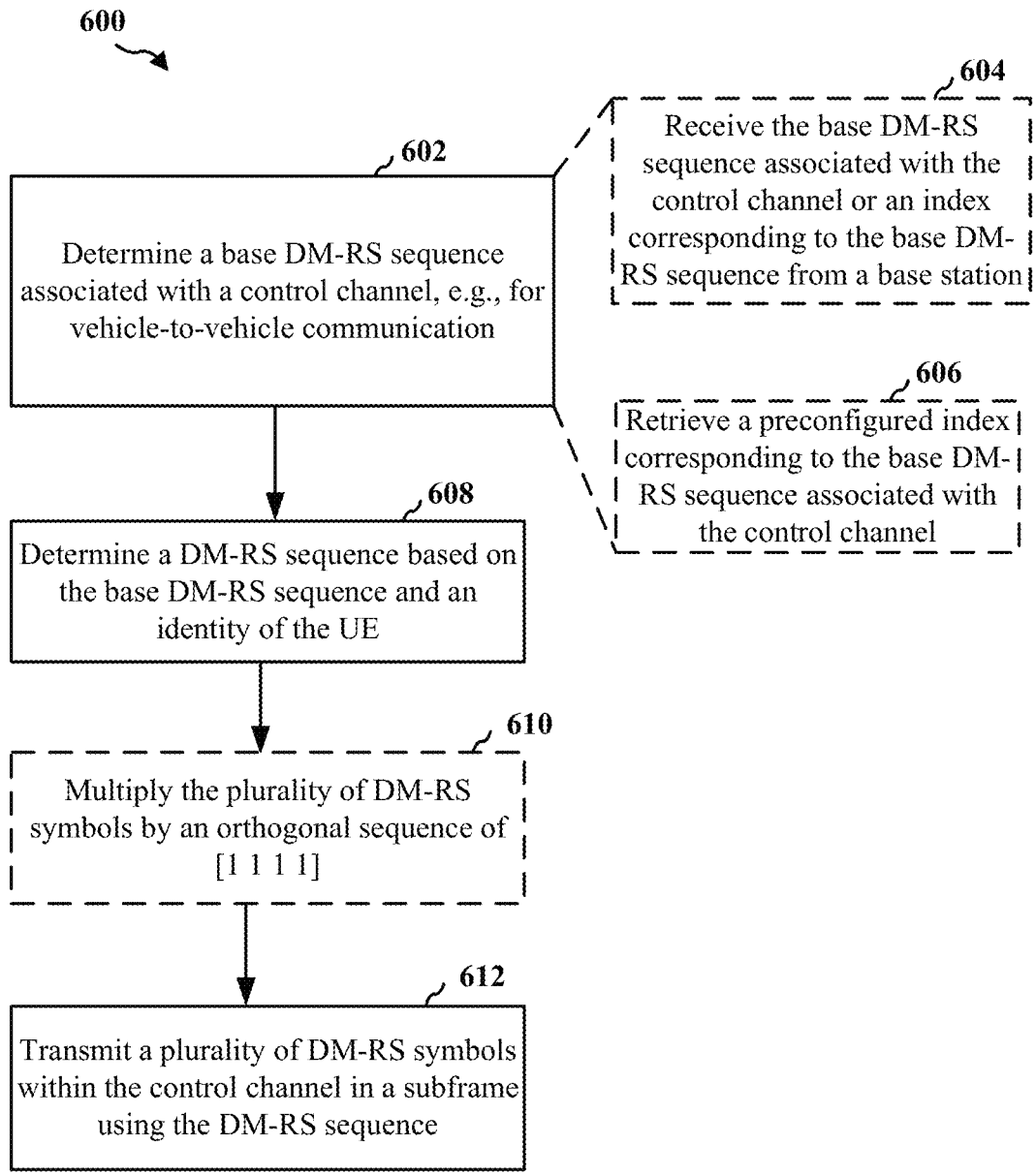
FIG. 6 is a flowchart of a method of wireless communication.

FIG. 6 is a flowchart 600 of a method of wireless communication. The method may be performed by a UE (e.g., the UE 104, 350, 402, or the apparatus 802/802'). At 602, the UE may determine a base DM-RS sequence associated with a control channel for vehicle-to-vehicle communication. In one configuration, the control channel may be a PSCCH. For example, with reference to FIG. 4, the UE performing the method may be UE 402 and the control channel may be the control channel 400 illustrated in FIG. 4. In one configuration, the base DM-RS sequence may be configured by a base station (e.g., base station 102) and/or another network entity and communicated to the UE. Thus in some configurations, as part of determining the base sequence at 602 (or prior to the operation at 602) the UE at 604 may receive the base DM-RS sequence associated with the control channel or an index (u) corresponding to the base DM-RS sequence from a base station. In some such configurations, the base DM-RS sequence is determined based on the information received from the base station, e.g., the index (u) corresponding to the base DM-RS sequence. In some other configurations, the index for the base sequence for the control channel may be pre-configured at the UE (e.g., stored in a memory). In some such configurations, at 606 the UE may retrieve the pre-configured index corresponding to the base DM-RS sequence and determine/derive the base DM-RS sequence based on the retrieved index. Thus, the UE may determine the base DM-RS sequence in a variety of ways.

Following the determination of the base DM-RS sequence, the UE at 608 may determine a DM-RS sequence based on the base DM-RS sequence (determined at 602) and an identity of the UE. In one configuration, the identity of the UE may be a Temporary Mobile Subscriber Identity (TMSI). In one configuration, the DM-RS sequence may be a cyclic-shifted version of the base DM-RS sequence. In such a configuration, the DM-RS sequence may be selected from a pool, e.g., a set, of cyclic-shifted versions of the base DM-RS sequence based on the identity of the UE. In one configuration, the size of the set may be four. For example, referring to FIG. 4, a first DM-RS sequence is used for the $3^{rd}$, $6^{th}$, $9^{th}$, and $12^{th}$ symbols of the subframe (each of which is a DM-RS symbol) corresponding to the control channel 400 transmitted by UE 402, and the first DM-RS sequence is determined from a set of 4 different DM-RS sequences each of which is a cyclic shifted version of the base DM-RS sequence. The determination of the first DM-RS sequence for the four DM-RS symbols is based on the identity of the UE 402. In some configurations, the identity, e.g., TMSI, of the UE 402 may be mapped to a DM-RS sequence from the pool using a predetermined function and the DM-RS sequence that maps to the TMSI of the UE 402 is selected as the first DM-RS sequence for the DM-RS symbols transmitted in the control channel 400. Thus, in various configurations the DM-RS sequence used for the DM-RS symbols may be a cyclic-shifted version of the base DM-RS sequence.

In one configuration, at 610, the UE may multiply the plurality of DM-RS symbols within the subframe by an orthogonal sequence before transmitting the plurality of DM-RS symbols. For example, let $s\_k(n)$, $0<=n<M_{SC}^{RS}$ be a DMRS sequence (corresponding to a DM-RS symbol of the plurality of DM-RS symbols) before multiplication, where k=0, 1, 2, 3 indicates the DMRS symbol index within a subframe. Let the orthogonal sequence be W, where W is a 1-by-4 array. Then the $k^{th}$ sequence after multiplication is $s'\_k(n)=W(k)*s\_k(n)$, $0<=n<M_{SC}^{RS}$. In one configuration, the plurality of DM-RS symbols of the control channel may be multiplied by an orthogonal sequence of [1 1 1 1].

Next at 612, the UE may transmit the plurality of DM-RS symbols within the control channel in the subframe using the DM-RS sequence. In one configuration, the total number of the plurality of DM-RS symbols within the subframe corresponding to the control channel may be four. In some other configurations, the plurality of DM-RS symbols within the subframe may be another number greater than two.

Various features and aspects related to the DM-RS design for a data channel that may be used for D2D and/or V2V type communications will now be discussed with respect to flowchart 700 of FIG. 7. Some features related to the DM-RS design for the data channel described herein may provide advantages and improvements over existing V2V communication solutions, for example in high speed and high density environments. In an aspect, in some configurations, additional DM-RS symbols (e.g., as compared to earlier/existing systems) in each data channel subframe may be used. The use of additional DM-RS symbols in the channel (e.g., control and data channels) may be advantageous, e.g., for handling high Doppler shift associated with higher relative speeds at high frequencies, and allowing for better tracking/estimation of the data channel at high speeds, e.g., around 250 Kilometers/hour. An exemplary data channel subframe structure of the data channel (e.g., PSSCH) implemented in accordance with one configuration is illustrated in FIG. 5 and discussed above.

Figure 7:
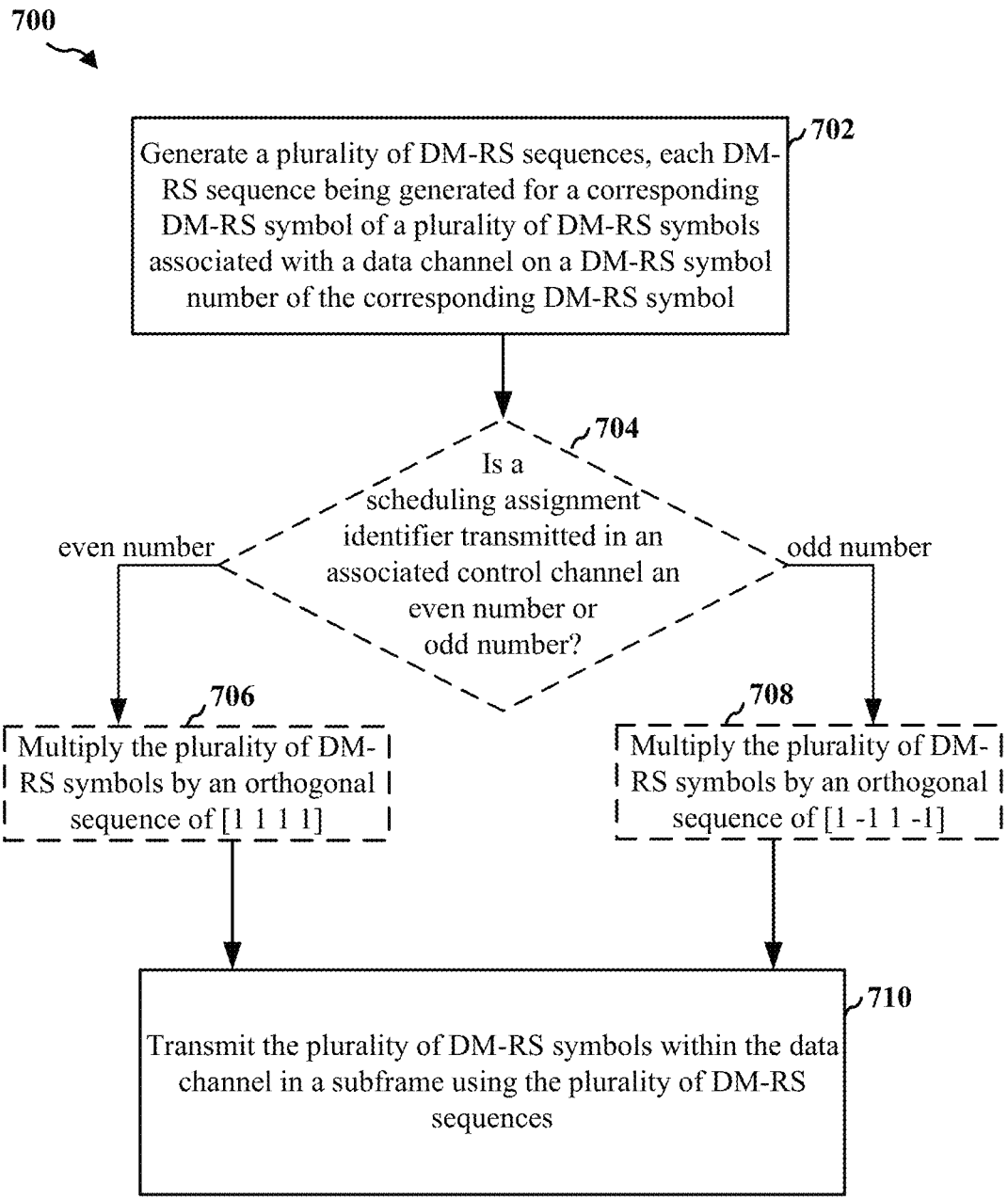
FIG. 7 is a flowchart of another method of wireless communication.

FIG. 7 is a flowchart 700 of a method of wireless communication. The method may be performed by a UE (e.g., the UE 104, 350, 402, or the apparatus 802/802'). At 702, the UE may generate a plurality of DM-RS sequences. Each DM-RS sequence of the plurality of DM-RS sequences may be generated for a corresponding DM-RS symbol of a plurality of DM-RS symbols associated with a data channel (e.g., such as the data channel 500 for V2V and/or D2D type communication) based on the DM-RS symbol number of the corresponding DM-RS symbol. In one configuration, each DM-RS sequence may be generated further based on the subframe number associated with the subframe corresponding to the data channel. For example, as discussed earlier with regard to FIG. 5, the group-hopping procedure that generates DM-RS sequences for the data channel 500 (e.g., PSSCH) may be based on a DM-RS symbol number (not to be confused with symbol number within a subframe). The DM-RS symbol number may be defined as $4*n\_\{ssf\}^\{PSSCH\}+i$, where i=0, 1, 2, 3 and indicates the DM-RS symbol index within a subframe and $n\_\{ssf\}^\{PSSCH\}$ is the subframe number modulo 10. The symbol number so obtained using the above formula may be mapped to an index (u) of the DM-RS base sequence that may be used in generating a DM-RS sequence for a corresponding DM-RS symbol of the data channel. In some configurations where the data channel has 4 DM-RS symbols in the subframe (i=0, 1, 2, 3), 4 DM-RS symbol numbers may be obtained for 4 corresponding DM-RS sequences.

In one configuration, the plurality of DM-RS sequences may be based on Zadoff-Chu sequences. In one configuration, the data channel may be the PSSCH. In one configuration, the total number of the plurality of DM-RS symbols may be four.

In some configurations, at 704 the UE may determine whether the scheduling assignment identifier transmitted in an associated control channel is an even number or an odd number, e.g., in order to select an orthogonal sequence for applying to the plurality of the DM-RS symbols. Since the UE transmits the associated control channel as well, the UE is aware of the scheduling assignment identifier transmitted in the control channel. In an aspect, the UE may be configured to select an orthogonal sequence of [1 1 1 1] for applying (e.g., multiplying) to the plurality of the DM-RS symbols in the data channel when the SA identifier transmitted in the associated control channel is an even number and select an orthogonal sequence of [1 −1 1 −1] for applying to the plurality of the DM-RS symbols in the data channel when the SA identifier transmitted in the associated control channel is an odd number. For example, with reference to FIGS. 4-5, the control channel 400 (e.g., PSCCH) may be associated with the data channel 500 (e.g., PSSCH), e.g., the control channel 400 may carry control information for the data transmitted by the UE 402 in the data channel 500. If the SA ID transmitted in the control channel 400 is an even number, then the UE 402 may use orthogonal sequence of [1 1 1 1] for applying to the plurality of the DM-RS symbols in the data channel 500 and may use orthogonal sequence of [1 −1 1 −1] when the SA ID transmitted in the control channel 400 is an odd number. Accordingly, at 706 the UE may multiply the plurality of the DM-RS symbols in the data channel by an orthogonal sequence of [1 1 1 1] when the SA ID transmitted in the associated control channel is an even number. On the other hand, when the SA ID transmitted in the associated control channel is an odd number, then at 708 the UE may multiply the plurality of the DM-RS symbols in the data channel by an orthogonal sequence of [1 −1 1 −1].

At 710, the UE may transmit the plurality of DM-RS symbols within the data channel in a subframe using the plurality of DM-RS sequences (e.g., generated in the manner discussed at 702). For example, the UE may be the UE 402 and the plurality of the DM-RS symbols within the data channel in the subframe may be the 4 DM-RS symbols in the data channel 500 in the subframe 501.

Figure 8:
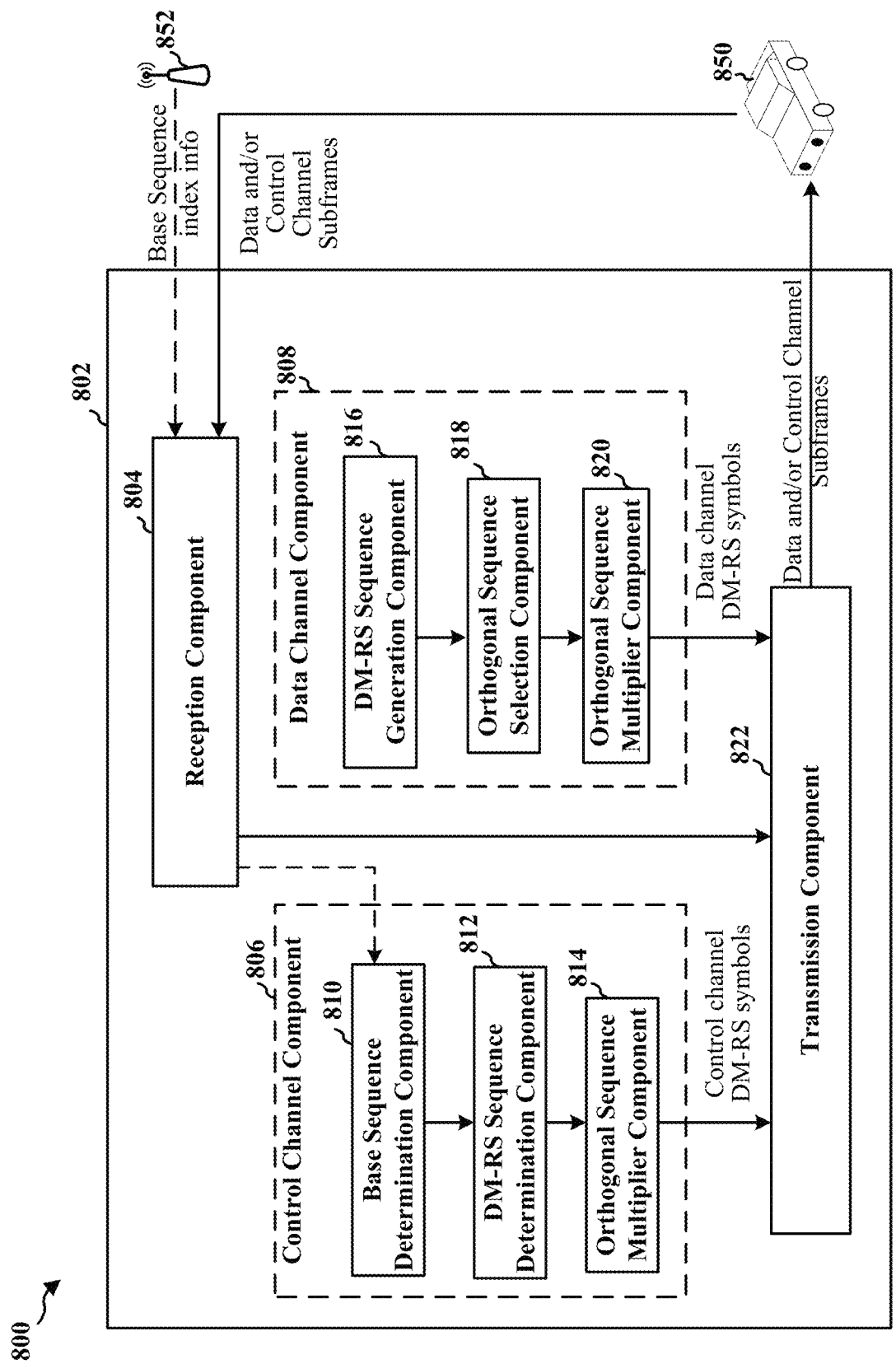
FIG. 8 is a conceptual data flow diagram illustrating the data flow between different means/components in an exemplary apparatus.

FIG. 8 is a conceptual data flow diagram 800 illustrating the data flow between different means/components in an exemplary apparatus 802. The apparatus may be a UE capable of V2V communications. The apparatus 802 may include a reception component 804, a control channel component 806, data channel component 808, and a transmission component 822. As discussed below, the control channel component 806 and the data channel component 808 may each include one or more addition components to perform various function discussed with respect to the flowcharts 600 and 700 of FIGS. 6-7, respectively.

The reception component 804 may be configured to receive control signals, data signals, and/or other information from other devices such as base station 852 and/or other UEs such as UE 850. For example, in one configuration the reception component 804 may receive an index corresponding to a DM-RS base sequence from a base station. The reception component 804 may be configured to receive subframes corresponding to control and data channels transmitted by the UE 850. The transmission component 822 may be configured to transmit control signals, data signals, and/or other information to other devices such as base stations and/or other UEs such as UE 850. The reception component 804 and the transmission component 822 cooperate to coordinate the communication of the apparatus 802.

The control channel component 806 may include a base DM-RS sequence determination component 810, a DM-RS sequence determination component 812, and an orthogonal sequence multiplier component 814. The base DM-RS sequence determination component 810 may be configured to determine a base DM-RS sequence associated with a control channel for V2V communication. The control channel may be a PSCCH used by the apparatus 802 to transmit control information to the UE 850. In one configuration, the base DM-RS sequence determination component 810 may be configured to determine the base DM-RS sequence based on an index corresponding to the base DM-RS sequence received from the base station 852. In some other configurations, the index corresponding to the base DM-RS sequence may be pre-configured in the apparatus and the base DM-RS sequence determination component 810 may be configured to retrieve the pre-configured index and determine the base DM-RS sequence based on the pre-configured index.

The DM-RS sequence determination component 812 may be configured to determine a DM-RS sequence based on the base DM-RS sequence and an identity associated with the apparatus 802. For example, the apparatus 802 may be a UE and the identity associated with the UE may be the TMSI of the UE. In one configuration, the DM-RS sequence determined by the determination component 812 may be a cyclic-shifted version of the base DM-RS sequence. In such a configuration, the determination component 812 may select the DM-RS sequence from a pool, e.g., a set, of cyclic-shifted versions of the base DM-RS sequence based on the identity of the apparatus 802. In some configurations, a DM-RS sequence that maps to the TMSI of the UE 402 may be determined to be the DM-RS sequence for the DM-RS symbols transmitted in the control channel. Thus, the DM-RS sequence used for the DM-RS symbols may be a cyclic-shifted version of the base DM-RS sequence.

The orthogonal sequence multiplier component 814 may be configured to multiply the plurality of DM-RS symbols within the subframe of the control channel by an orthogonal sequence of [1 1 1 1] (or another predetermined sequence) before transmitting the plurality of DM-RS symbols. The transmission component 822 may be configured to transmit the plurality of DM-RS symbols within the control channel in a subframe using the DM-RS sequence determined by the DM-RS sequence determination component 812. In one configuration, the total number of the plurality of DM-RS symbols within the subframe corresponding to the control channel may be four. For example, the apparatus 802 may be UE 402 and the control channel may be the control channel 400 of FIG. 4. In this example, the transmission component 822 may be configured to transmit the 4 DM-RS symbols within the control channel 400 in the subframe 401 using the determined DM-RS sequence.

The data channel component 808 may include a DM-RS sequence generation component 816, an orthogonal sequence selection component 818, and a orthogonal sequence multiplier component 820. The DM-RS sequence generation component 816 may be configured to generate a plurality of DM-RS sequences. Each DM-RS sequence may be generated for a corresponding DM-RS symbol of a plurality of DM-RS symbols associated with a data channel for V2V communication based on a DM-RS symbol number of the corresponding DM-RS symbol. For example, the data channel may be a PSSCH such as illustrated in FIG. 5. In some configurations, DM-RS sequence generation component 816 may be configured to generate each DM-RS sequence further based on a subframe number associated with the subframe corresponding to the data channel as discussed earlier with respect to FIGS. 5 and 7. In some configurations, each DM-RS symbol of the plurality of DM-RS symbols of data channel may have a different DM-RS sequence. As discussed supra with respect to FIGS. 5 and 7, in some configurations a DM-RS sequence for a DM-RS symbol of the data channel may be generated based on a DM-RS symbol number. In one configuration, the DM-RS symbol number may be defined as $4*n\_\{ssf\}^{\{PSSCH\}}+i$, where i=0, 1, 2, 3 indicates the DM-RS symbol index within a subframe and $n\{ssf\}^{\{PSSCH\}}$ is the subframe number modulo 10. Thus, in some configurations, the DM-RS sequence generation component 816 may be configured to generate a plurality of DM-RS sequences based on the above discussed formula.

The orthogonal sequence selection component 818 may be configured to select an orthogonal sequence (e.g., from a plurality of predetermined orthogonal sequences including orthogonal sequences [1 1 1 1] and [1 −1 1 −1]) for applying, e.g., multiplying, to the plurality of DM-RS symbols of the data channel based on a scheduling assignment identifier transmitted in an associated control channel. For example, in one configuration the orthogonal sequence selection component 818 may be configured to select an orthogonal sequence of [1 1 1 1] for multiplying to the plurality of DM-RS symbols of the data channel when the scheduling assignment identifier transmitted in the associated control channel is an even number, and select an orthogonal sequence of [1 −1 1 −1] when the scheduling assignment identifier transmitted in the associated control channel is an odd number.

The orthogonal sequence multiplier component 820 may be configured to multiply the plurality of DM-RS symbols within the subframe of the data channel by the selected orthogonal sequence (e.g., [1 1 1 1] or [1 −1 1 −1]) before the data channel subframe is transmitted. For example, in one configuration the orthogonal sequence multiplier component 820 may multiply the plurality of DM-RS symbols within the subframe by the orthogonal sequence of [1 1 1 1] when the scheduling assignment identifier transmitted in the associated control channel is an even number and multiply the plurality of DM-RS symbols within the subframe by the orthogonal sequence of [1 −1 1 −1] when the scheduling assignment identifier is an odd number. The transmission component 822 may be configured to transmit the plurality of DM-RS symbols within the data channel in the subframe using the plurality of DM-RS sequence generated by the DM-RS sequence generation component 816. In one configuration, the total number of the plurality of DM-RS symbols within the subframe corresponding to the data channel may be four.

The apparatus may include additional components that perform each of the blocks of the algorithm in the aforementioned flowcharts of FIGS. 5 and 6. As such, each block in the aforementioned flowcharts of FIGS. 5 and 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
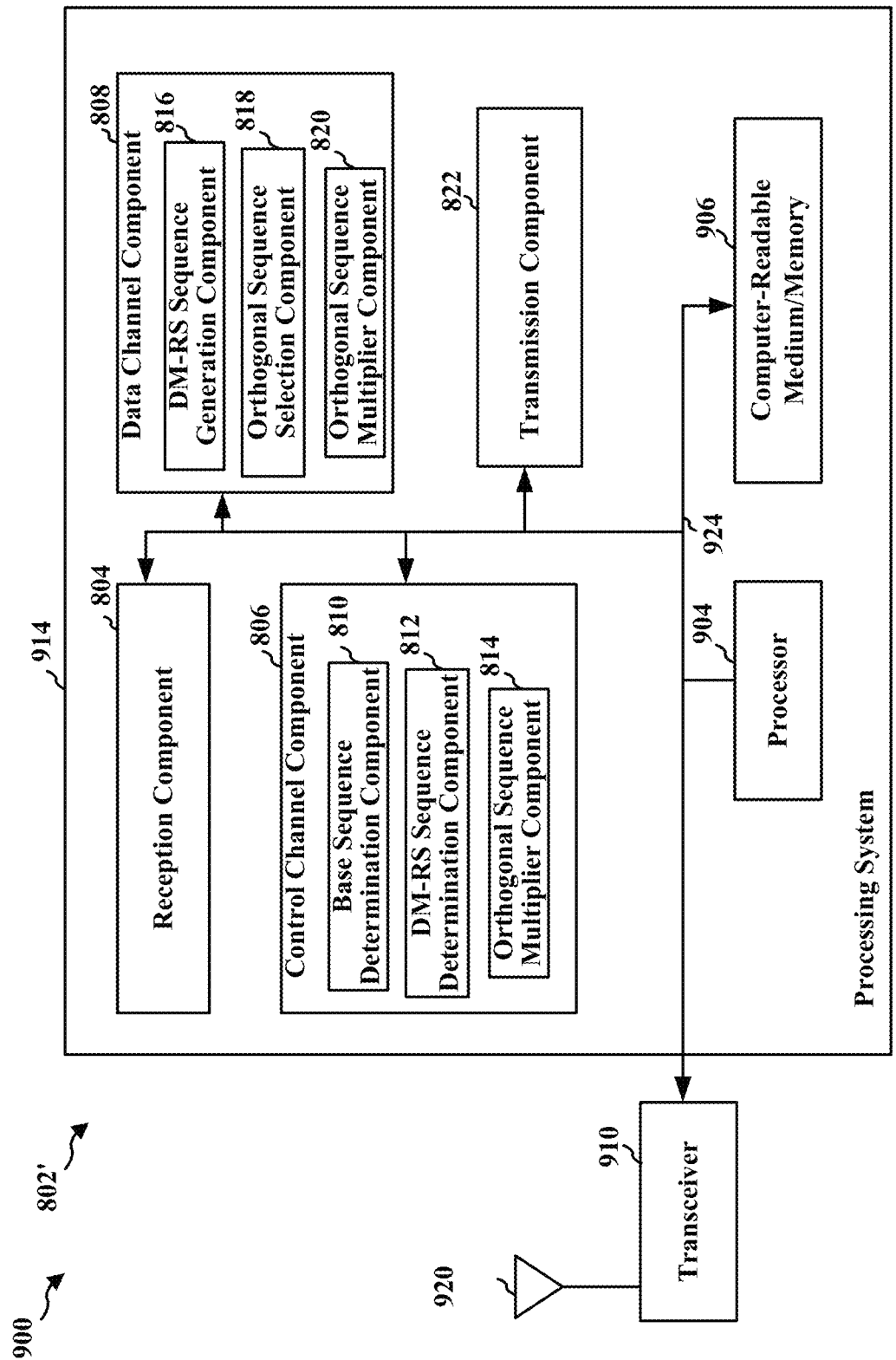
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806 (including 810, 812, 814), 808 (including 816, 818, and 820), 822, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 822, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806 (including 810, 812, 814), 808 (including 816, 818, and 820), 822. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 369, the RX processor 356, and the controller/processor 359.

In one configuration, the apparatus 802/802' for wireless communication may include means for determining a base DM-RS sequence associated with a control channel for V2V communication. In one configuration, the apparatus 802/802' may include means for determining a DM-RS sequence based on the base DM-RS sequence and an identity of the apparatus. In one configuration, the apparatus 802/802' may include means for transmitting a plurality of DM-RS symbols within the control channel in a subframe using the DM-RS sequence. In one configuration, the apparatus 802/802' may include means for multiplying an orthogonal sequence of [1 1 1 1] to the plurality of DM-RS symbols.

In one configuration, the apparatus 802/802' may include means for receiving an index corresponding to the base DM-RS sequence from a base station. In one configuration, the means for determining the base DM-RS sequence may be configured to determine the base DM-RS sequence based on the index corresponding to the base DM-RS sequence received from the base station. In one configuration, the means for determining the base DM-RS sequence may be configured to determine the base DM-RS sequence based on a pre-configured index corresponding to the base DM-RS sequence, e.g., retrieved from the memory 906. In some configurations, the means for determining the DM-RS sequence may be configured to select the DM-RS sequence from a subset of cyclic-shifted versions of the base DM-RS sequence based on the identity of the apparatus.

In one configuration, the apparatus 802/802' may include means for generating a plurality of DM-RS sequences, each DM-RS sequence being generated for a corresponding DM-RS symbol of a plurality of DM-RS symbols associated with a data channel for vehicle-to-vehicle communication based on a DM-RS symbol number of the corresponding DM-RS symbol. In one configuration, the apparatus 802/802' may further include means for transmitting the plurality of DM-RS symbols within the data channel in a subframe using the plurality of DM-RS sequences. In one configuration, the apparatus 802/802' may include means for multiplying an orthogonal sequence of [1 1 1 1] to the plurality of DM-RS symbols when a scheduling assignment identifier transmitted in an associated control channel is an even number. In one configuration, the apparatus 802/802' may include means for multiplying an orthogonal sequence of [1 −1 1 −1] to the plurality of DM-RS symbols when the scheduling assignment identifier is an odd number.

The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
    determining a base demodulation reference signal (DM-RS) sequence associated with a control channel for vehicle-to-vehicle communication;
    determining a DM-RS sequence based on the base DM-RS sequence based on an identity of the UE; and
    transmitting a plurality of DM-RS symbols that use the same DM-RS sequence determined based on the identity of the UE in the control channel within the control channel in a transmission time interval (TTI) using the DM-RS sequence.

2. The method of claim 1, wherein the control channel is a physical sidelink control channel (PSCCH).

3. The method of claim 1, wherein the base DM-RS sequence is determined based on an index corresponding to the base DM-RS sequence received from a base station.

4. The method of claim 1, wherein the base DM-RS sequence is determined based on a pre-configured index corresponding to the base DM-RS sequence.

5. The method of claim 1, wherein the DM-RS sequence is determined based on the identity of the UE, wherein the identity of the UE is a Temporary Mobile Subscriber Identity (TMSI).

6. The method of claim 1, wherein the plurality of DM-RS symbols include four DM-RS symbols.

7. The method of claim 6, further comprising multiplying the plurality of DM-RS symbols by an orthogonal sequence of [1 1 1 1].

8. The method of claim 1, wherein the DM-RS sequence is a cyclic-shifted version of the base DM-RS sequence.

9. The method of claim 8, wherein the DM-RS sequence is selected from a subset of all cyclic-shifted versions of the base DM-RS sequence based on the identity of the UE.

10. The method of claim 9, wherein a size of the subset is four.

11. An apparatus for wireless communication, the apparatus being a user equipment (UE), comprising:
    a memory; and
    at least one processor coupled to the memory and configured to:
    determine a base demodulation reference signal (DM-RS) sequence associated with a control channel for vehicle-to-vehicle communication;
    determine a DM-RS sequence based on the base DM-RS sequence based on an identity of the UE; and
    transmit a plurality of DM-RS symbols that use the same DM-RS sequence determined based on the identity of the UE in the control channel within the control channel in a transmission time interval (TTI) using the DM-RS sequence.

12. The apparatus of claim 11, wherein the at least one processor is further configured to determine the base DM-RS sequence based on one of an index corresponding to the base DM-RS sequence received from a base station, or a pre-configured index corresponding to the base DM-RS sequence retrieved from the memory.

13. The apparatus of claim 11, wherein the DM-RS sequence is determined based on the identity of the UE, wherein the identity of the UE is a Temporary Mobile Sub scriber Identity (TMSI).

14. The apparatus of claim 11, wherein the at least one processor is further configured to multiply the plurality of DM-RS symbols by an orthogonal sequence of [1 1 1 1].

15. The apparatus of claim 11, wherein the DM-RS sequence is selected from a subset of all cyclic-shifted versions of the base DM-RS sequence based on the identity of the UE.

16. The apparatus of claim 15, wherein a size of the subset is four.

17. A method of wireless communication of a user equipment (UE), comprising:
generating a plurality of demodulation reference signal (DM-RS) sequences, each DM-RS sequence being generated for a corresponding DM-RS symbol of a plurality of DM-RS symbols associated with a sidelink channel based on a DM-RS symbol number of the corresponding DM-RS symbol; and
transmitting the plurality of DM-RS symbols within a data channel in a transmission time interval (TTI) using the plurality of DM-RS sequences, wherein the DM-RS symbol number comprises a first index of the DM-RS symbol in reference to a frame, wherein the DM-RS symbol number is based on a subframe number and a second index of the DM-RS symbol within the TTI.

18. The method of claim 17, wherein the plurality of DM-RS sequences are based on Zadoff-Chu sequences.

19. The method of claim 17, wherein the data channel is a physical sidelink shared channel (PSSCH).

20. The method of claim 17, wherein a total number of the plurality of DM-RS symbols is four.

21. The method of claim 20, further comprising multiplying the plurality of DM-RS symbols by an orthogonal sequence of [1 1 1 1] when a scheduling assignment (SA) identifier transmitted in an associated control channel is an even number.

22. The method of claim 21, further comprising multiplying the plurality of DM-RS symbols by an orthogonal sequence of [1 −1 1 −1] when the SA identifier is an odd number.

23. The method of claim 17, wherein the DM-RS symbol number is based on $4*n\_\{ssf\}^{\{PSSCH\}}+i$, wherein i indicates the index of the DM-RS symbol within the TTI and wherein $n\_\{ssf\}^{\{PSSCH\}}$ comprises a subframe number modulo 10.

24. The method of claim 17, wherein the sidelink channel comprises the data channel for vehicle-to-vehicle communication or device-to-device communication.

25. An apparatus for wireless communication, the apparatus being a user equipment (UE), comprising:
a memory; and
at least one processor coupled to the memory and configured to:
generate a plurality of demodulation reference signal (DM-RS) sequences, each DM-RS sequence being generated for a corresponding DM-RS symbol of a plurality of DM-RS symbols associated with a sidelink channel based on a DM-RS symbol number of the corresponding DM-RS symbol; and
transmit the plurality of DM-RS symbols within a data channel in a transmission time interval (TTI) using the plurality of DM-RS sequences, wherein the DM-RS symbol number comprises a first index of the DM-RS symbol in reference to a frame, wherein the DM-RS symbol number is based on a subframe number and a second index of the DM-RS symbol within the TTI.

26. The apparatus of claim 25, wherein the plurality of DM-RS sequences are based on Zadoff-Chu sequences.

27. The apparatus of claim 25, wherein the data channel is a physical sidelink shared channel (PSSCH).

28. The apparatus of claim 25, wherein a total number of the plurality of DM-RS symbols is four.

29. The apparatus of claim 28, wherein the at least one processor is further configured to multiply the plurality of DM-RS symbols by an orthogonal sequence of [1 1 1 1] when a scheduling assignment (SA) identifier transmitted in an associated control channel is an even number.

30. The apparatus of claim 29, wherein the at least one processor is further configured to multiply the plurality of DM-RS symbols by an orthogonal sequence of [1 −1 1 −1] when the SA identifier is an odd number.

31. The apparatus of claim 25, wherein the DM-RS symbol number is based on $4*n\_\{ssf\}^{\{PSSCH\}}+i$, wherein i indicates the index of the DM-RS symbol within the TTI and wherein $n\_\{ssf\}^{\{PSSCH\}}$ comprises a subframe number modulo 10.

32. The apparatus of claim 25, wherein the sidelink channel comprises the data channel for vehicle-to-vehicle communication or device-to-device communication.

* * * * *